United States Patent [19]

Vass

[11] Patent Number: 4,590,218

[45] Date of Patent: May 20, 1986

[54] METHOD AND APPARATUS FOR FORMING A CHEMICAL COMPOSITION FROM CROSS-LINKING COMPONENTS AND PRODUCT OF THE METHOD

[75] Inventor: Richard T. Vass, Antioch, Calif.

[73] Assignee: The O'Brien Corporation, South San Francisco, Calif.

[21] Appl. No.: 746,993

[22] Filed: Jun. 19, 1985

[51] Int. Cl.$^4$ .............................................. C08G 18/14
[52] U.S. Cl. ....................................... 521/50; 264/51;
427/250; 427/385.5; 427/386; 427/388.1;
427/388.2; 428/425.8; 521/78; 521/101;
521/917
[58] Field of Search ................... 521/50, 78, 101, 917;
427/250, 385.5, 386, , 388.1, 388.2; 428/425.8;
264/51

[56] References Cited

U.S. PATENT DOCUMENTS

| | | | |
|---|---|---|---|
| 4,302,550 | 11/1981 | Pisanic et al. | 521/917 |
| 4,423,161 | 12/1983 | Cobbs et al. | 521/917 |
| 4,430,446 | 2/1984 | Lynn | 521/917 |
| 4,448,902 | 5/1984 | Cobleny et al. | 521/917 |

Primary Examiner—Maurice J. Welsh
Attorney, Agent, or Firm—Donald C. Feix; John A. Bucher

[57] ABSTRACT

A method and apparatus for forming a chemical composition from two liquid components selected for cross-linking reaction with each other and a product of the method are disclosed, the method including the steps of selecting the components for interaction to form a solid chemical composition product, the components being intimately mixed with an inert blowing agent to avoid altering chemical characteristics of the chemical composition product and to vary density of the product, the mixture being conducted to an application zone through an expansion chamber having internal dimensions selected for achieving substantially complete expansion of the mixture to a substantially relaxed condition as it passes from the expansion chamber. In one embodiment, means are provided for spraying the product onto the application zone. In another embodiment, delay means are provided for causing increased viscosity of the components. Mesh material forms an integral portion of one preferred product. Another product is formed upon a structural member to which the material is applied in regions of different densities.

58 Claims, 10 Drawing Figures

METHOD AND APPARATUS FOR FORMING A CHEMICAL COMPOSITION FROM CROSS-LINKING COMPONENTS AND PRODUCT OF THE METHOD

BACKGROUND OF THE INVENTION

The present invention relates to a method for forming a cross-linked chemical composition and a product of the method as well as apparatus for carrying out the method. More particularly, the invention relates to such a method, apparatus and resulting product wherein numerous variations are possible in characteristics of the resulting product.

Methods have been disclosed in the prior art for forming cross-linked chemical compositions useful in a wide variety of applications. Typically, such methods have consisted of the intermixing of selected components, one normally including a blowing agent, to form a product of selected density. Such prior art methods have been carried out for example in urethane systems based either on polyether or polyester components and known isocyanates as well as in epoxy systems. Other prior art techniques have been employed where preliminary expansion or foaming of the product was carried out before the product was applied to an application zone. Such techniques have commonly been denoted by the term "froth foaming" and have been widely used in applications for depositing both rigid and flexible foams for a variety of end uses. However, these "froth foaming" techniques have generally been characterized by continued expansion of the material due to physical characteristics of a blowing agent contained therein or to reaction of the components for producing additional blowing agent to result in continued expansion.

In addition to compositions of the type referred to above, it has also been known in the prior art to employ coal tar products as cross-linking agents in order to achieve both economy and waterproofing in the resulting end product.

In yet other prior art applications, such materials have also been sprayed onto selected application zones including structural members and other surfaces, with foaming taking place after the material is sprayed, to result in a final product.

Even with all of these prior art techniques for combining cross-linking components to form different chemical compositions, there has been found to remain a need for improved apparatus and methods of carrying out such reactions in order to achieve improved characteristics in the resulting product. The manner in which the present invention achieves these improvements is made apparent in the following description.

SUMMARY OF THE INVENTION

Accordingly, it is an object of the invention to provide an improved method and apparatus for forming a chemical composition from liquid components selected for cross-linking reaction with each other as well as to provide improved products thereof.

More particularly, it is an object of the invention to provide a method for forming a chemical composition from two liquid components selected for cross-linking reaction with each other, comprising the steps of selecting the components to be suitable for interaction to form a solid chemical composition product, intimately mixing the components and introducing an inert blowing agent selected to avoid altering chemical characteristics of the resulting chemical composition product and to produce selected density reduction within the chemical composition product by physical expansion, the combination of the liquid components and blowing agent being transferred to an application zone through an expansion chamber selected with a configuration and internal dimensions for allowing substantially complete expansion of the chemical composition to a substantially relaxed condition as the product passes from the expansion chamber to the application zone.

It is a further preferred object of the invention to provide a method wherein the liquid components are initially free of blowing agent so that they can be stored in unpressurized containers and whereby the components can be used in a variety of different applications including techniques resulting in chemical composition products having varying densities.

It is another related object of the invention to provide a method wherein the chemical composition product is sprayed onto the application zone.

Yet another related object of the invention is to provide a method including a delay step for causing the liquid components to experience a predetermined dwell time after initial mixing and prior to entering the expansion chamber and being combined with the blowing agent in order to adjust viscosity of the component mixture for assuring confinement of the blowing agent.

It is yet a further related object of the invention to provide a method wherein the chemical composition product is applied onto a mesh material forming an integral portion of the resulting product.

It is another object of the invention to provide a method for forming a composite structural product having substantially the same chemical composition throughout while having regions of different densities, the composite structure being formed from two liquid components as described above, selection of the inert blowing agent and selection of the liquid components to initially be free from active blowing agents resulting in the uniform chemical composition of the resulting composite structure formed by passage of the intimately mixed components and blowing agent through an expansion chamber of the type referred to above.

It is a related object of the invention to provide a method wherein the expansion chamber has a generally tubular internal configuration with the mixing station being located at one end thereof, an opposite end of the tubular expansion chamber forming an opening for permitting the fully expanded and relaxed chemical composition product to pass to the application zone.

Yet another object of the invention is to provide a method for forming a product with a selected density which is not dependent upon containment or restraint, the selected density being achieved by means of a chemically inert blowing agent combined with a mixture formed from first and second components capable of cross-linking reaction to form a resulting product, the components and blowing agent being combined within an expansion chamber having internal dimensions related to the characteristics of the liquid mixture material and the injected blowing agent in order to cause substantially all of the expansion action to occur in the expansion chamber prior to passage of the expanded material in a relaxed, substantially fully expanded condition from the outlet of the expansion chamber to an application zone.

It is yet another object of the invention to provide a system for carrying out one or more of the methods summarized above, the system including means for carrying out each of the steps summarized within the method or methods.

It is a related object of the invention to provide such a system further comprising means for introducing a moving gas stream through an expansion chamber of the type described above in order to entrain particles of expanded material in a substantially relaxed, fully expanded condition for spraying the expanded material onto a surface in an application zone.

Yet another related object of the invention is to provide a system further comprising delay means for effectively increasing viscosity of a mixture of components in order to assure confinement of a blowing agent therein during and after passage of the components and blowing agent through an expansion chamber as described above.

It is yet another object of the invention to provide products resulting from the method or methods summarized above by means of apparatus such as is also summarized above.

It is another object of the invention to form a composite structure comprising first and second generally uniform chemical compositions formed from liquid components and a blowing agent as described above in order to produce different regions having different densities for accomplishing different functions within the structure.

Other and further objects of the invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and changes may be made as desired by those skilled in the art without departing from the present invention and the purview of the appended claims.

BRIEF DESCRIPTION OF THE DRAWING VIEWS

FIG. 1 is a schematic representation of a system for processing liquid polymers to form an end product which has variable density in accordance with one embodiment of the present invention.

FIG. 2 is a pictorial view showing additional features of the system of FIG. 1.

FIG. 3 is an elevation view, partly in cross section to show details of construction, of apparatus for spraying the variable density product produced by the system shown in FIGS. 1 and 2.

FIG. 3A is a view taken from the right end of FIG. 3 to better illustrate a spray nozzle in the apparatus.

FIG. 4 is an end elevation view, partly in cross section, to show one specific application of the variable density product of the present invention to a rail bed installation.

FIG. 5 is a view, somewhat similar to FIG. 1, but showing an embodiment of the invention in which the components include low viscosity or longer reactivity materials.

FIG. 6 is a view like FIG. 5 but showing a construction in which the components are premixed to adjust viscosity.

FIG. 7 is a graphical representation of the process of the present invention with typical values of viscosity plotted against time.

FIG. 8 is a fragmentary view similar to FIG. 3 while illustrating another variation of apparatus constructed according to the invention for forming a sprayed product including abrasive particles for developing negative buoyance in the resulting product.

FIG. 9 is a plan view, partly broken away, to show details of a product made in accordance with the present invention and incorporating a fabric reinforcement.

DETAILED DESCRIPTION OF THE PREFERRED EMBODIMENTS

FIG. 1 is a schematic view of a system for processing a polymer system having two components to form a product of variable density in accordance with one embodiment of the present invention.

With reference to FIGS. 1 and 2, the system of the present invention is indicated generally by the reference numeral 21.

The system 21 includes a container 23 for holding a supply of a first component, a container 25 for holding a supply of a second component, a blowing agent source 27 and a mixer 29. The two containers 23 and 25 are indicated as a single block 24 in the schematic view of FIG. 1, as described in greater detail below.

In accordance with the present invention, the system 21 includes an expansion chamber 31 as an essential feature. As described in more detail below, the expansion chamber 31 is preferably formed as a cylinder and causes the product of the present invention to be formed to a variable density and in a state, at the outlet of the expansion chamber, in which the product is substantially fully expanded so that it can then be transferred in a relaxed, nonstressed condition to an application site 32 and allowed to flow freely within or on the application site. Because the product is nonstressed at this point, the product readily conforms to the application site and does not require a containment mold or other structure for the purpose of regulating the final density of the product as applied.

The product, as applied to the application site, is substantially free of internal stress and develops its memory in a particularly advantageous manner, as will be more apparent from the detailed description to follow.

As will also be described in more detail below, the product from the outlet of the expansion cylinder 31 may be either poured at the application site or sprayed (for example, by apparatus shown in FIG. 3 and described below).

Before describing the apparatus, method and product of the invention in greater detail, a number of advantages and essential characteristics of the apparatus, method and its product are first summarized below in order to provide a better understanding of the invention and novel features thereof. As noted above, substantially complete expansion of the mixed material results in the expansion chamber 31 to result in a relaxed condition of the material as it leaves the expansion chamber for transfer to the application site.

In accordance with the present invention, the product at the application site achieves the desired density without the requirement for a containing mold because of its manner of expansion as described immediately above. However, the method and apparatus of the present invention can be used with a closed mold if, for example, such a closed mold is desired for the purpose of establishing a particular molded shape for the overall configuration of the product. Furthermore, the mold may be vented or unvented.

As also noted above, it is important that the material leaving the expansion chamber be in a flowable condition with sufficient strength to contain the blowing agent in expanded and dispersed form. The flowable condition of the material is important to permit proper application in a variety of situations as will be described in greater detail below.

It is also generally essential within the invention that the material have sufficient viscosity for maintaining dispersion of the blowing agent as it passes to and through the expansion chamber. This condition is generally evidenced by a lack of out-gassing after the material leaves the expansion chamber.

The invention also contemplates that the blowing agent be inert with respect to the components forming the resulting product, particularly after the material leaves the expansion chamber so that there is substantially no expansion of the material at the application site. For the same reason, the components forming the product of the invention are also selected to exclude active blowing agents such as water, amines, etc.

The method of the present invention forms a product finished naturally with a skin on the exposed surface of the product and also at interfaces with structural contact surfaces.

The term "inert blowing agent" refers to blowing agents which do not affect expansion by chemical means but does include blowing agents which cause expansion by thermal effects at the temperatures at which the processing is taking place. Thus, an R11 fluorocarbon is an inert blowing agent. R12 fluorocarbon is a more effective blowing agent for this system, however, as it is introduced externally to the mix and provides much more rapid expansion. The term inert blowing agent does not include a blowing agent with hydroxyl groups or water, or amine type materials that would tend to react with one of the components. In a typical system the isocyanate portion of the system generally produces carbon dioxide which acts as a blowing agent.

The present invention provides a high closed cell content. Depending upon the application and the particular components being used, this characteristic may be utilized to provide good electrical insulation and/or good resistance to moisture absorption.

Another important feature of the present invention is the fact that memory is developed at the application site as the material conforms to the configuration or structural surfaces to be coated or covered. It is believed that this characteristic results from the non-stressed condition of the product as it is transferred to the application site.

The present invention may be used with a fabric membrane to provide reinforcement, as will be described in greater detail below. In this regard, the relaxed state in which the material is produced at the outlet of the expansion chamber enables the material to penetrate openings in reinforcement prior to the time that the product cross-links to the point where it is cured and turns solid. Other types of mesh reinforcement, such as metal strands, fiberglass yarn, carbon fibers and the like can also be used with the present invention.

The present invention permits a range of densities including very high densities to be obtained with foamed products without the need for mold restraint during formation. For example, densities across the range of 20 to 50 pounds per cubic foot can readily be obtained. At the same time, it is important to note that the chemical properties of the expanded product are the same as for the unexpanded product after initial combination of its components since no other reactions, such as blowing agent formation, are occurring. Similarly, the chemical properties of the product are unchanged regardless of the final density of the product.

In many applications of the present invention, only a small amount of blowing agent is used, in some cases less than one-half of one percent, depending upon the densities desired.

The blowing agent or gas is selected as an inert substance which does not react chemically with the components so that no additional side reactions or other undesirable reactions occur during formation of the product.

The minimum amount of blowing agent required in the present invention is believed to be due to the cells being present in the final product as initially formed when they leave the expansion chamber 31. To this extent, the invention is characterized in such applications in that there is little or no out-gassing in the product as applied to the application site.

As noted above, none of the components used to form a product of the invention contains a blowing agent. This enhances their package stability in that heating will not tend to cause out-gassing or expansion of the drum. Also, since the components do not initially include blowing agents, they can be used for applications requiring solid materials where expansion by a blowing agent is not desired. The absence of a blowing agent is a further advantage in that it is possible to add variable amounts of blowing agent to the mixed components to permit formation of a final product with variable density in accordance with an important object of the invention.

Preferred methods and apparatus for realizing the above advantages and essential characteristics are described or made obvious below.

With continued reference to the drawings, particularly FIG. 2, in one specific embodiment of the present invention, the component within the container 23 is hereinafter referred to as component A. This A component is an isocyanate prepolymer of generally conventional composition except for specific requirements stated herein and may, for example, comprise toluene diisocyanate (TDI), methylene diisocyanate (MDI), etc.

The component within the container 25 is hereinafter referred to as the B component. In one specific embodiment, the B component is a polyol also of generally conventional composition except for limitations stated herein. The polyol may, for example, be selected as a polyether, polyester, epoxy, etc.

As is well known in the prior art, the A and B components include other constituents such as catalysts, accelerating agents, decelerating agents and/or stabilizers, for example, depending on the particular application. However, it is important that neither component contain any constituent forming an active blowing agent as defined herein.

In one embodiment of the invention illustrated by one or more examples below, the A and B components are selected to include coal tar in order to form a relatively inexpensive, generally water proof product. Many conventional coal tar systems are known in the prior art, as set forth for example in U.S. Pat. No. 3,412,050 issued Nov. 19, 1968, and it is contemplated that at least a number of these systems may be used or adopted for use in the present invention as well as those specifically described below.

Figure 2:
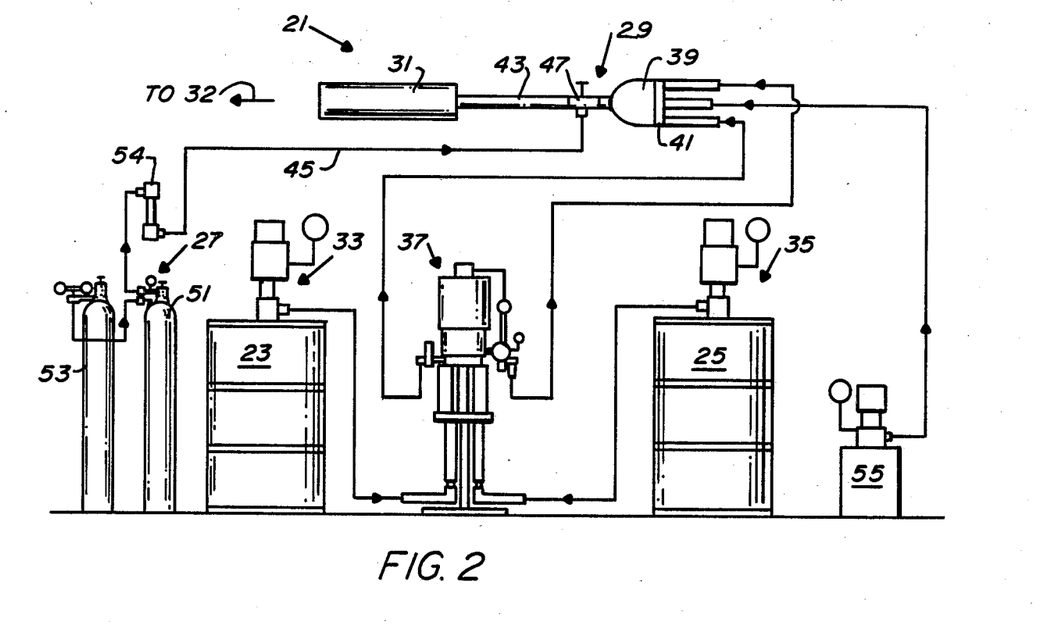

As illustrated in FIG. 2, each of the containers 23 and 25 has a material transfer pump indicated at 33 and 35 respectively. These transfer pumps 33 and 35 serve to maintain a constant supply of the respective A and B components to a proportioning pump 37.

The proportioning pump 37 in turn supplies the components in metered proportions to a mixer manifold 39 which forms a part of the mixer 29 referred to above. The mixer manifold 39 is a conventional, commercially available valving system. It includes ball valves and check valves to allow the A and B components to come together and also contains a separate valve to allow for solvent to be used to purge the system for cleanup. The mixer manifold 39 includes a handle 41 for on/off control of the material supply through the mixture manifold.

The mixer 29 shown in FIG. 2 also includes a static mixer 43. In the static mixer 43, the A and B components are intimately mixed together. A blowing agent is also introduced into the materials while they are in the process of being mixed in the static mixer 43. The blowing agent is introduced through a line 45 and a needle valve 47.

Figure 1:
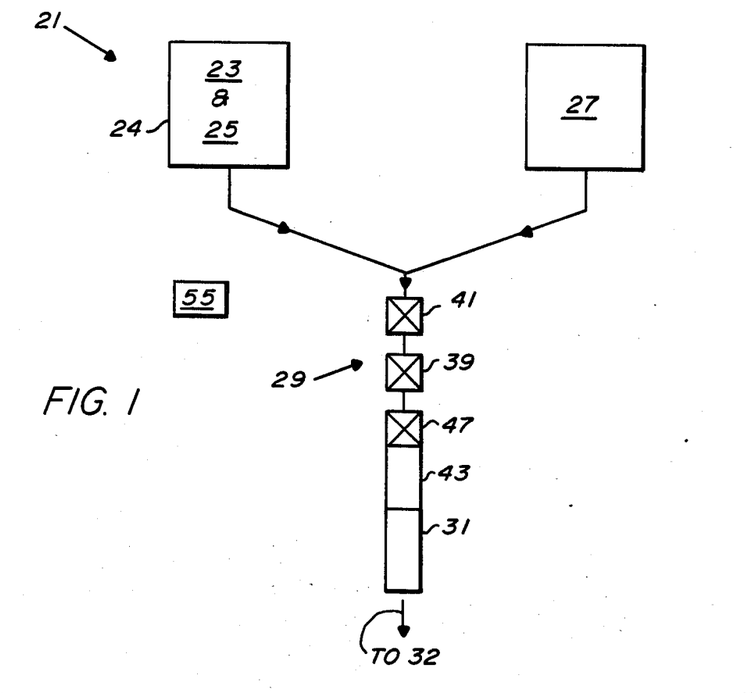

The blowing agent, in the particular embodiment of FIG. 1 is preferably a fluorocarbon identified by the trademark FREON R12 which may be obtained from Allied Chemical Corporation or from Dupont Corporation or from a number of other companies.

The FREON R12 blowing agent is a fluorocarbon having a boiling point of approximately 21 degrees F., R12 being an industry designation in the chemical industry. As illustrated in FIG. 2, the R12 fluorocarbon is contained within a storage tank 51, and the tank 51 is preferably pressurized by a nitrogen tank 53.

As will be described in more detail below, other inert blowing agents may be used in the present invention including gas or air, provided the air is dry air.

Gasses or liquids having a low boiling point and chemically inert with the A and B components are suitable blowing agents.

The system shown in FIG. 2 includes a solvent pump 55 which is used for the usual purpose of cleanup.

The components described above in connection with FIG. 2 are generally conventional in themselves while serving a novel function in combination with the expansion chamber 31. Accordingly, no further description is believed necessary for the components of FIG. 2 except for the expansion chamber 31 which is described in substantial detail below.

With continued reference to FIG. 2, the volume, width and length dimensions of the expansion chamber 31 are matched to the A and B components and to the characteristics of the blowing agent in order to produce substantially complete expansion of the product by the time the product reaches the outlet of the expansion chamber.

The expansion cylinder 31 is shown in FIG. 2 as an open ended cylinder which does not contain any valving. Similarly, the expansion cylinder does not have a nozzle or other structure at its outlet which could have the effect of producing back pressure or restraining flow of the material through the expansion cylinder. Thus, the only restraint produced by the expansion chamber results from its selected cross-sectional dimensions, for example, its diameter, and its selected length.

It is an essential feature of the present invention that the expansion cylinder have sufficient volume and length to permit the material to achieve stable cell formation which to date has been accomplished by observing the appearance of the material as it exits the expansion cylinder.

In one particular embodiment of the present invention, the expansion cylinder has a length of 12 inches, an inside diameter of 1 inch and is circular in cross-section.

However, the length and internal diameter of the expansion cylinder may be varied independently of one another to best match the characteristics of the A and B components and the type and amount of blowing agent or gas being used. Such matching can be performed, for example, by following the parameters set forth below.

Material flow from the outlet of the expansion chamber can be checked visually, for example, to insure that flow volume is generally constant. If the volume flow is decreasing, this is an indication that the gas is not being stably entrapped. Such a condition may also be accompanied by out-gassing of blowing agent. Another condition of operation that can be visually observed is the uniform and continuous flow of material from the expansion cylinder to facilitate application as described below.

The volume, length and diameter of the expansion chamber are matched to the characteristics of the A and B components and the characteristics of the blowing agent and the pumping output in order to insure the proper rate of expansion in the expansion chamber. For example, material exiting the expansion chamber should not grow volumetrically as may be observed, for example, in the case of an aerosol shaving cream coming out of a shaving cream can. If the material is observed to expand volumetrically as it exits the expansion chamber, a preferred remedial action is to reduce the rate of blowing agent flow into the mixing chamber in order to reduce volume of the material to generally equal the internal volume of the expansion chamber. The density of product from the expansion chamber could then be determined. If the density is too great, it would then be possible to increase the diameter or cross-sectional area of the expansion cylinder and also increase the flow rate of blowing agent to match the expanded volume of the product with the internal volume of the expansion chamber. These steps could be repeated until a desired density were achieved.

If the material were observed to be collapsing after exiting the expansion chamber, while other properties of the material were within desired limits, a remedial action would be to increase the length of the expansion chamber. Here again, some experimentation may be required to determine the proper length for a given application.

In certain applications, however, it may be necessary to increase the length of the expansion chamber by an inordinate amount in order to produce the desired results. Rather than increasing the length of the expansion chamber by an excessive amount, other remedial measures may be employed instead of or in addition to varying the length of the chamber. For example, adjustments could be made within the A and B components described above, to accommodate a particular component system to the expansion chamber of the present invention. For example, alternate means of cross-linking or increasing viscosity could be considered as well as use of catalysts to increase reactivity of the components.

In this regard, one should note the need for proper sequencing of the reaction as described in greater detail below with reference to FIGS. 5 and 6.

The relationship of the diameter of cross-sectional area of the expansion chamber to other process parameters such as those described above must be selected in order to maintain constant flow rate and flow volume without developing excessive back pressure or restraint in the expansion chamber. For example, if the flow volume of the material were less than the cross-sectional area of the expansion chamber, a possible remedial action would be to reduce the diameter or cross-sectional area of the expansion chamber.

For similar reasons, an increase in material output or, for example, increased flow volume resulting from higher capacity pumping equipment would require modification of the expansion chamber in a similar manner as described above.

The expansion chamber is constructed from any of a number of materials, for example, metal, plastic or other materials as long as the expansion chamber is not reactive with the product passing therethrough.

Although not shown in the drawings, cooling can be applied to the expansion chamber to increase the viscosity of the material if necessary or desirable. Heat can also be applied to the expansion chamber, for example, to achieve increased reactivity or cross-linking. In any event, a primary purpose for any such modifications would be to maintain the material in a fully expanded, relaxed condition upon exiting the expansion chamber as described above.

Figure 7:
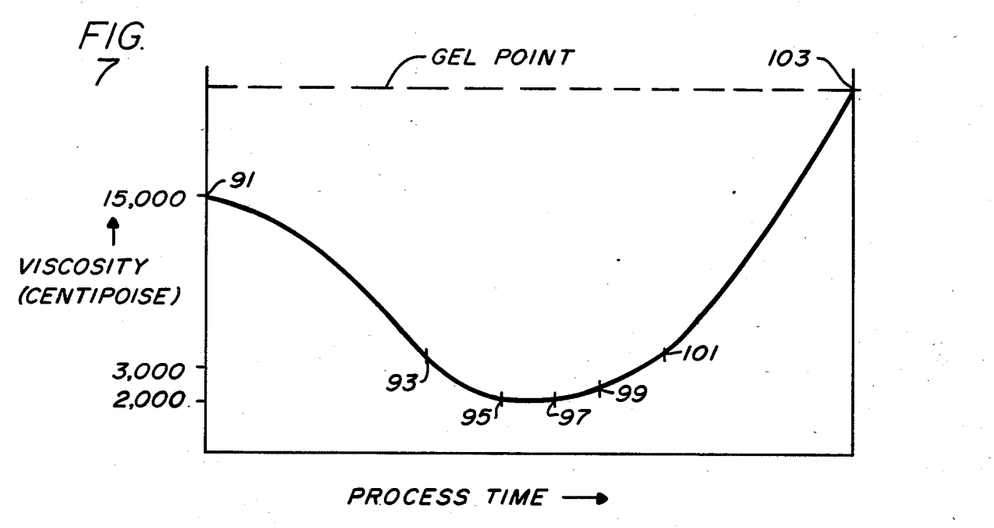

With reference to FIG. 7, viscosity is plotted versus heat as an indication of the reactivity or exit condition of the material as it leaves the expansion cylinder. The plot of FIG. 7 is contemplated as a typical but not limiting example of process conditions in accordance with the present invention.

The initial temperature shown in FIG. 7 is for the material in storage, for example, components A and B in containers 23 and 25 of FIG. 2. At ambient temperatures, the material might, hypothetically, have a viscosity of approximately 15,000 centipoise at 77 degrees Fahrenheit as indicated at 91. The material or materials are then heated, for example, by inline heaters or by heating in the containers 23 and 25 to raise their temperature to about 130 degrees F. as indicated at 93 in FIG. 7 and to decrease viscosity to approximately 800 centipoise.

At point 93, the material or components A and B of FIG. 2 are passing from the material transfer pumps 33 and 35 through the proportioning pump 37 to the mixer manifold 39 and into the static mixer 43. The A and B components then enter the expansion chamber resulting in an initial temperature drop indicated at 95 and a viscosity of about 500 centipoise, for example. Thereafter, components A and B are combined within the static mixer 43 as indicated at 97. At that point, an exothermic reaction commences between the components and produces additional heat. However, blowing agent is introduced shortly thereafter and is intimately mixed with the reacting components. The blowing agent causes a cooling effect and also initiates expansion of the component mixture as the mixture of the A and B components and the blowing agent, all intimately mixed together, enters the expansion chamber at 99. Viscosity of the mixture increases continuously as it passes through the expansion chamber because of the cooling effect of the blowing agent and also because of cross-linking taking place between the A and B components. In a typical application, the viscosity of the mixture exiting the expansion chamber may be in the range of about 2,000-3,000 centipoise. At the same time, expansion of the material is substantially complete as the material leaves the expansion chamber. Thus, the material is in the fully expanded and relaxed condition referred to above as it is transferred to the application site. Thereafter, the material continues to cross-link, usually to a viscosity in the range of 300,000 centipoise, to result in gelation as indicated at 103.

In the present invention, material exiting the expansion cylinder is in a fluid and flowable state. When the A and B components are isocyanate prepolymer and polyol as described above, the material exhibits a granular appearance as it leaves the outlet of the expansion cylinder.

The method and apparatus for expanding material to a variable density, in accordance with the preceding description, are illustrated through the following examples. These examples, while demonstrating preferred embodiments of the apparatus, method and product of the invention, are not to be considered a limitation thereon, it being understood that many variations and modifications, for example, in the apparatus component, method parameters and material constituents, when employed by those skilled in the art, may be practiced without departing from the spirit and scope of the present invention as defined by the claims.

EXAMPLE 1

This example is described with reference to FIG. 2, described above, and components A and B are identified as follows:

The A component is methylene diisocyanate (MDI) of a type available, for example, from Mobay Chemical Company under the trade designation XP-744.

The B component is a conventional polyether polyol system including polyols of about 2,000 molecular weight.

The A and B components, as used in Example 1 and briefly summarized above, are fully described in Table 5 on page 6 of a brochure published by Mobay Chemical Company and entitled *"Thick Section Coatings"* (C5-3B), (June, 1981). In Table 5 of the above publication, a system including components similar to the A and B components referred to above is identified by the trade designation NB#277453.

In this example, components A and B were combined in a 1.6:1 ratio on a weight basis or about two to one on a volume basis. Both components A and B were initially heated, in their separate containers 23 and 25, to within the range of 90 to 130 degrees F., specifically about 130 degrees F., and combined in equipment illustrated in FIG. 2 with an output rate of 1 gallon per minute for the proportioning pump 37. The combined components A and B were then introduced into the static mixing chamber 43 as described above and shown in FIG. 2.

At the same time, an R12 fluorocarbon blowing agent was introduced into the static mixing tube through the needle valve 47 at a rate of about ½ percent by volume or more specifically 22 cubic centimeters per minute (cc/m). Components A and B were intimately mixed with each other and with the blowing agent within the mixing chamber. As the mixture of components A, B and the blowing agent left the mixing chamber 43, it was in a liquid condition prior to passage into the expansion chamber 31.

In this example, the expansion chamber was a steel tube having an inside diameter of 1 inch and a length of 12 inches. The material exiting the mixing tube 43 was allowed to expand into the expansion chamber and pass through the expansion chamber to achieve the following characteristics prior to transfer to an application site. The material exiting the expansion chamber was deposited in an open-top container 8 inches by 10 inches by 4 feet in length.

The material produced in this example resulted in a product having the characteristics described above, in particular a foam having a density of 22 pounds per cubic foot.

EXAMPLE 2

The steps of Example 1 were repeated except that the output rate for combined components A and B from the proportioning pump was increased to 1½ gallons per minute. The blowing agent was introduced at the rate of 46 cubic centimeters per minute (cc/min.). The material was deposited in a similar container as in Example 1.

This similarly resulted in production of a product in the form of a foam having a density of 22 pounds per cubic foot.

In Example 2, the length of the expansion chamber was increased to 18 inches while the diameter remained at 1 inch.

EXAMPLE 3

The steps of Example 1 were again repeated, the output rate for combined components A and B being maintained at 1 gallon per minute. The R12 fluorocarbon blowing agent was introduced at the rate of 10 cubic centimeters per minute (cc/min.).

Carrying out the remaining steps of Example 1 resulted in a product in the form of a foam having a density of 32.9 pounds per cubic feet.

EXAMPLE 4

The steps of Example 1 were again repeated with the combined output of components A and B being reduced as well as the R12 fluorocarbon blowing agent. Specifically, the output rate for combined components A and B was 1 gallon per minute and the R12 blowing agent was introduced at the rate of 5 cubic centimeters per minute (ccpm).

The steps of Example 1 were otherwise repeated except that the expansion chamber had a diameter of ½ inch and a length of 12 inches.

Example 4 resulted in a product in the form of a foam again having a density of 22 pounds per cubic foot.

EXAMPLE 5

This example related to a coal tar prepolymer suitable for producing an inexpensive water-proof product.

The two component coal tar prepolymer system used in connection with Example 5 is also fully described in Table 7 as "SOLVENT-FREE COAL-TAR-MODIFIED MAINTENANCE COATING", "FORMULATION MTS-6" of the June, 1981 publication by Mobay Chemical Company entitled *"Thick Section Coatings"* (C5-3B).

As disclosed by the above publication, the coal tar prepolymer system includes an A component in the form of methylene diisocyanate (MDI) available for example, from Mobay Chemical Company under the trade designation DESMODUR E-21.

A polyol or B component comprises approximately 324 parts by weight of a refined coal tar (available, for example, from the Koppers Company under the trade designation KC 261), 70 parts by weight of 1,4 butanediol and 84 parts by weight of anhydrous calcium sulfate, a desiccant available, for example, under the trade name DRIERITE from The W. A. Hammond Drierite Co.

The starting temperatures for components A and B were respectively 120 degrees F. and 130 degrees F. Components A and B were pumped at a one-to-one ratio with a combined pumping output rate of 1.5 gallons per minute from the proportioning pump of FIG. 2. R12 fluorocarbon blowing agent was introduced along with the A and B components into a static mixing chamber as shown in FIG. 2 at the rate of about 50 cubic centimeters per minute. The combined components exiting the static mixing tube were transferred to an expansion chamber having an inside diameter of 1 inch and a length of 12 inches. The materials combined and passing through the expansion chamber were applied to an open topped container as described in Example 1 resulting in a product in the form of a foam having a density of 22 pounds per cubic foot.

Examples 6 and 7 described below relate to methods for forming material according to the present invention where the material is applied to mesh in the form of metal hardware cloth or fiberglass cloth, for example, in order to provide increased tear resistance in the final product.

EXAMPLE 6

The steps of Example 1 were again repeated except that the material exiting the expansion chamber was applied to form a trench liner where the material was deposited on damp earth over a ⅛th inch opening metal hardware cloth. This resulted in a product in the form of a foam having a density of 22 pounds per cubic foot. The foam penetrated through the fabric and conformed with the surface of the earth to form a monolithic membrane for this application. The fabric provided additional reinforcement to the product to an extent that significantly increased the load sustaining and tear resistance characteristics of the product.

EXAMPLE 7

In this example, the product composition and characteristics were the same as those set out above for Example 6 except that the reinforcement fabric was a fiberglass cloth of relatively close mesh construction. In this example, the product again exhibited increased tear resistance as compared to the product without the fabric reinforcement.

The opening size of the fabric was observed to be quite small, approximately 1/64th of an inch or less and the product penetrated through the openings.

Figure 3:
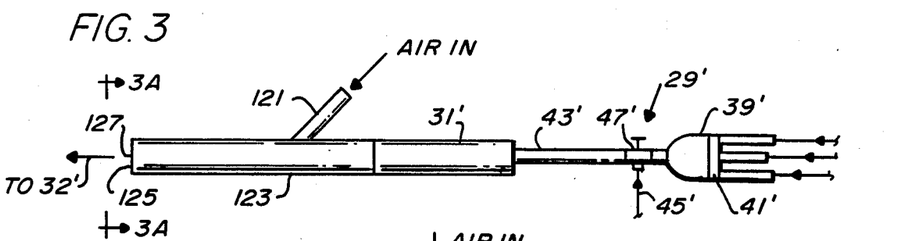
Figure 3A:
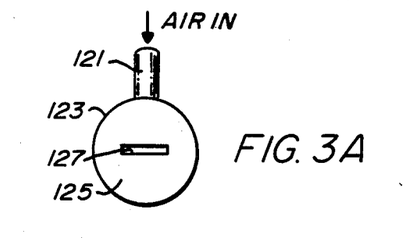

Examples 8 and 9 relate to a method for forming material according to the present invention wherein the material is sprayed until a selected surface with equipment as generally described above with reference to FIG. 2 while being modified as illustrated in FIG. 3. The modified apparatus of FIG. 3 is described below in Example 8.

Figure 9:
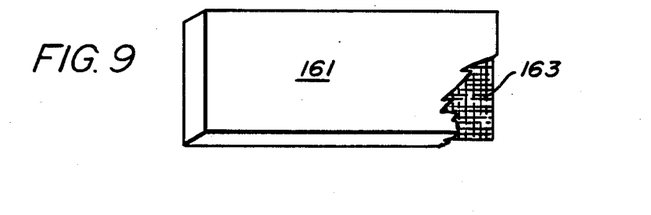

A product formed according to Examples 8 and 9 is generally indicated at 161 in FIG. 9, mesh in the form of either the metal hardware cloth of Example 6 or the fiberglass cloth of Example 7 being indicated at 163 to provide increased tear resistance for the material 161.

EXAMPLE 8

In this example, the expanded product of the invention was sprayed onto a structural surface formed from steel plate. The A and B components as well as the blowing agent were the same as described above in connection with Example 1. All flow rates, etc., were also the same as described above in Example 1 except that, as illustrated in FIG. 3, a modified expansion chamber 31' was employed rather than the expansion chamber 31 of FIG. 2. The modified expansion chamber 31' was generally similar to that of FIG. 2 in terms of internal cross section and length. However, the modified expansion chamber included a Y-fitting 121 arranged for communication at midlength with the modified expansion chamber 31', the Y-fitting being arranged at approximately 45 degrees to the access 123 of the expansion chamber 31'. The internal diameter of the Y-fitting was approximately 1 inch.

The modified expansion chamber 31' was also formed with a closure 125 at its outlet end forming an outlet nozzle 127 which, in this particular example, measured approximately 1/16th inch by ¾ inches to form a total area for the outlet nozzle of approximately 3/64th square inches.

With the components, blowing agent and flow rates being the same as in Example 1 as noted above, air was introduced through the Y-fitting at a flow rate selected to produce a pressure of approximately 60 pounds per square inch (psi).

Air introduced through the Y-fitting caused the product to be sprayed through the outlet nozzle 127 without the introduction or development of substantial back pressure within the expansion chamber. Spraying was thus achieved by the increased velocity of transport through the expansion chamber under the influence of air introduced through the Y-fitting.

The product resulting from this example was in the form of a foam having a density of approximately 22 pounds per cubic foot with a generally uniform cellular texture.

EXAMPLE 9

The steps of Example 8 were repeated except that the product was sprayed onto a sheet of polyethylene film in order to permit the foam coating to be released from the polyethylene sheet for visual examination. In this example, a blowing agent was introduced initially as described above in Example 1 to develop a foam layer approximately sixty one thousandths of an inch (60 mils) thick. The blowing agent was then cut off from the mixing chamber in order to apply a solid coating approximately 20 mils thick over the foam.

After this variable density product (including both the foamed layer of 60 mils and the solid coating of 20 mils) was formed, it was stripped from the polyethylene film for examination.

Examination of the product confirmed the concept that the multiple density material would provide increased impact resistance in a lining employable, for example, in a coal hopper car. In such an application, the solid coating would provide resistance to direct impact applying engagement with coal loaded into the car. At the same time, a cushioning effect and reduced weight or density was provided by the underlying layer of foamed material.

As with the product of Example 8, the foamed or cellular portion of the product in Example 9 had a density of 22 pounds per cubic foot with a generally uniform cellular texture. The 20 mil layer of solid coating provided a smooth and continuous exposed surface for the finished product.

The entire product of Example 8 and the foamed portion of the product of Example 9 were applied according to the present invention wherein material exiting from the modified expansion chamber 31' was substantially fully expanded and in a generally relaxed condition in order to take advantage of various features of the invention as summarized above.

At the same time, the product of Example 9 illustrates another feature of the invention in that the density of the product may be instantaneously changed or varied within a given product or structure simply by changing the amount of blowing agent introduced to the mixing chamber. This ability to instantly vary the amount of blowing agent is of course due to the fact that the various components forming the product, for example, components A and B as described above, are free from blowing agent so that an appropriate amount of blowing agent may be instantaneously introduced in order to form a foamed product varying from a maximum density of substantially 100% to as low as 1.5 pounds per cubic foot, for example.

EXAMPLE 10

In this example, A and B components were employed which were identical to those described above in connection with Example 5. The temperature of the container or storage drums for the A component was approximately 130 degrees Fahrenheit while the temperature of the container or storage drums for the B component was approximately 130 degrees. Aproximately 1 part of the A component was combined with 2 parts of the B component by means of mixing pumps as described above in connection with FIG. 2 rather than by regulating valves. The combined flow rate of the two components at the inlet to the static mixer 43 (see FIG. 2) was approximately 1.5 gallons per minute. In this example, nitrogen was selected as the inert blowing agent. The nitrogen was introduced to the mixing tube 43 of FIG. 2 under a pressure of approximately 300 pounds per square inch (psi) by means of a flow control valve of the type indicated at 54 in FIG. 2. The flow rate through the control valve was visually selected to produce desired characteristics of the final product exiting the expansion cylinder 31 (see FIG. 2) in accordance with the present invention as described above.

The A and B components were initially stored in an unpressurized condition made possible by the absence of blowing agent therein, the inert blowing agent being introduced in the manner described immediately above for combination with the A and B components in the expansion chamber to complete expansion of the foam prior to its transfer from the expansion chamber to the application site.

In carrying out this example, the equipment was generally similar to that shown in FIG. 2 and described above. However, the static mixer 43 was of a conventional type containing internal baffles (not shown) for intimately mixing the nitrogen and the A and B components, the static mixer 43 having an internal length of 20 inches and being a cylinder with an inside diameter of ½ inch.

The expansion chamber used in this example and as generally illustrated in FIG. 2 was a metal cylinder having a circular cross section with an internal diameter of 1 inch and a length of 18 inches.

The product was poured from the outlet of the expansion cylinder into an open topped container as described above in example 1. When the product was cured, it was in the form of a foam exhbiting generally uniform cellular composition with a density of 16 pounds per cubic foot.

Example 10 (as well as numerous other examples set forth herein) illustrates a number of features of the present invention which are of particular importance. For instance, Example 10 illustrates multiple components such as the A and B components described above being stored in unpressurized condition as made possible by the absence of blowing agent, an inert blowing agent in the form of nitrogen being introduced at the time the components are combined.

Furthermore, Example 10 (as well as numerous other examples set forth herein) also discloses the use of such components both having substantially 100% solids composition. Within the present invention, the term "100% solids" refers to the components being non volatile under atmospheric conditions and at temperatures contemplated for the invention, for example, up to about 200 degrees Fahrenheit.

EXAMPLE 11

Example 11 represents another variation wherein an expanded product was formed according to the present invention with A and B components as described above in Example 8, in spraying apparatus similar to that described above with reference to FIG. 3 and further modified as described below with reference to FIG. 8 in order to form a foamed product with negative buoyancy characteristics.

Although Example 11 as described below sets for a spray technique for forming such a negative buoyancy foam product, it will be apparent that a similar product could be formed, for example, with apparatus of the type illustrated in FIG. 2 where the product is poured at the application site. However, since weighting of the product is achieved by the introduction of aggregate, it would be necessary to modify the equipment of FIG. 2 in order to assure uniform dispersion of the aggregate throughout the foam material.

Figure 8:
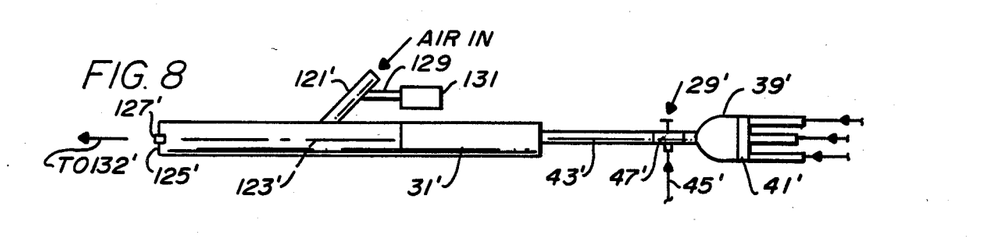

Continuing with reference to FIG. 8, apparatus of the type described above with reference to FIG. 3 was employed. Accordingly, the apparatus modification of FIG. 8 employs primed numerical labels generally corresponding to the numerical labels of FIG. 3.

As noted above in connection with FIG. 3, air was introduced into the modified expansion 31' of FIG. 8 through the Y-fitting 121' again arranged at about 45 degrees to the axis 123' of the expansion chamber 31'. In the modified apparatus of FIG. 8, the outlet end of the expansion chamber was open and did not contain an outlet closure or nozzle as indicated respectively as 125 and 127 in FIG. 3.

An additional Y-fitting 129 was connected with the Y-fitting 121' so that air passing through the Y-fitting 121' would produce a siphon effect to draw fine abrasive (not shown) from a source 131 for combination with the A and B components and blowing agent within the expansion chamber 31'.

In this example, as in Examples 8 and 9 set forth above, a product was formed with a generally uniform cellular content and a density of about 85 pounds per cubic foot. The fine abrasive was generally uniformly dispersed throughout the foam material in an amount sufficient to produce a negative buoyancy effect.

Otherwise, Example 11 was carried out in substantially the same manner and with the same materials and operating parameters described above in connection with Example 8.

EXAMPLE 12

This Example was again carried out employing apparatus of the type illustrated in FIG. 2 and described above, the method of Example 12 being employed for forming a bed for a track rail particularly suited for use with light transit vehicles and the like. Such a track rail is illustrated in cross section at 111 in FIG. 4, the track rail 111 being of a type having a lower rail flange 113 and an expanded upper flange 115 forming a groove 117 for receiving appropriately shaped vehicular wheels (not shown) conventionally adapted for use with such track rails.

Material formed according to the method of the present invention was selected in accordance with Example 5 described above in order to take advantage of the coal tar characteristics referred to above, for example, waterproof characteristics. At the same time, the coal tar material was selected to achieve electrical isolation of the rail 111 partly because of the waterproof characteristics of the coal tar and also because of the generally uniform closed cellular configuration of the foam material.

Figure 4:
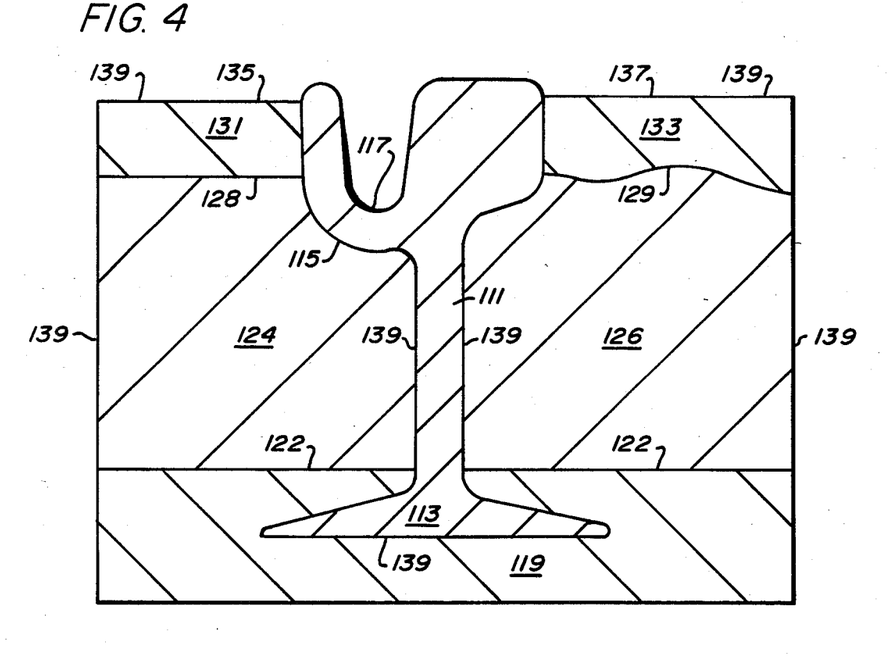

In carrying out the method of Example 12, the rail 111 was supported as illustrated in FIG. 4 in order to provide open space beneath and on both sides of the rail 111.

Solid unexpanded material was initially introduced beneath the lower flange 113 of the rail 111 in order to form a base 119 for supporting the rail 111. The solid material forming the base 119 was poured to encompass the lower flange 113 and extended just above the lower flange 113 to a level generally indicated at the interface 121. In pouring the base 119, it was possible, because of the flow characteristics of the solid material as deposited, to pour only on one side of the rail, the material tending to flow beneath the lower flange 113 of the rail. Thus, the material forming the base 119 tended to be self-leveling so that the interface 121 was at a generally uniform height on both sides of the rail 111.

Thereafter, pouring of material was continued with the introduction of a blowing agent as described above in FIG. 5 to deposit expanded material with a density of about 22 pounds per cubic foot in areas 124 and 126 on opposite sides of the rail 111. As will be apparent from an examination of FIG. 4, it was necessary to pour the two extended areas 124 and 126 separately since they were isolated from each other by the rail 111.

Pouring of expanded material in the areas 124 and 126 was continued to a height just above the bottom of the groove 117 in the upper flange 115 (as indicated at interfaces 128 and 129 on opposite sides of the rail 111 respectively above the foam areas 123 and 125).

Thereafter, the supply of blowing agent was cut off in the method and solid material was again deposited on opposite sides of the rail in areas 131 and 133 on opposite sides of the rail 111 above the interfaces 128 and 129. Solid material was poured in the areas 131 and 133 to a height generally indicated by the upper surfaces 135 and 137 on opposite sides of the rail generally adjacent the upper surface of the upper flange 115.

In carrying out the method of Example 12, a box configuration was formed about the rail 111 to define the product of the present invention in the region generally defined by the areas 119, 124, 126, 131 and 133.

As may be seen from further inspection of FIG. 4, this example further illustrates adaptability of the present invention to permit instantaneous change of density in a product for a given application, the material of different densities is indicated in the regions 124 and 126 as compared to thhhe solid material regions 119, 131 and 133 being of generally similar chemical characteristics because of the inert nature of the blowing agent used for forming the expanded foam in the regions 124 and 126.

A number of other characteristics are also apparent from FIG. 4. Initially, it may be seen that the ability of the material to flow about the rail during application of the base 119 permits uniform and complete encapsulation about the lower rail flange 113 to avoid formation of voids which could interfere with electrical isolation of the rail as described above.

As is also apparent from FIG. 4, the material of the present invention, when formed in an expanded or foamed manner as for the areas 124 and 126, formed a skin adjacent surfaces such as the rail 111 and exposed surfaces on the outer sides of the areas 124 and 126. Typically, this skin was non-cellular in nature even though deposited as formed material (as described above in connection with areas 124 and 126). The thickness of the skin indicated at 129 was nominally about 1/64th of an inch thick.

The cross section of FIG. 4 illustrates a number of other features which are relatively unique to the present invention as compared to other techniques for depositing foam products. In particular, the expanded material in areas 124 and 126 tended to form a flat upper surface such as that indicated by the interface 128 rather than forming the conventionally crowned surface for most foam products. This difference is again believed to be due primarily to the method of the present invention wherein the expanded material exits the expansion chamber 31 (see FIG. 2) in a fully expanded and relaxed condition. Some crown was observed in the interface 129 on the right side of the rail 111. However, the crown in the interface 129 is believed to have been due primarily to the dripping or deposit of additional material forming the area 126 rather than to expansion of the foam material in area 126 after deposition. Thus, in the overall structural arrangement illustrated in FIG. 4, the base 119 provided support for the rail 111. the expanded material in the areas 124 and 126 on opposite sides of the rail served similarly as the base 119 to electrically isolate the rail 111. However, the foam nature of the material in the areas 124 and 126 reduced the amount of the material requirements for encapsulating the rail 111. The areas 131 and 133 formed from solid material on opposite sides of the rail 111 formed a cap providing for excellent impact resistance on the exposed surfaces adjacent the groove 117 of the rail.

The overall structural composition of the encapsulation represented by the base 119 and the various 124, 126, 131 and 133 illustrates adaptability of the present invention to form a structural composition of instantaneously variable density. In addition, the areas represented in FIG. 4 illustrate versatility of the present invention to instantaneously adjust from formation of a material which is substantially 100% solid as indicated in the base 119 and areas 131, 133 to an xpanded density of 22 pounds per cubic foot, for example, as indicated in areas 124 and 126.

As was made apparent above and described in other examples, even further variation would be possible within the scope of the present invention where the density of such a material could be reduced to as little as 1.5 pounds per cubic foot. However, the minimum density for any given application would of course depend upon the components selected for the material as well as the characteristics of compressive strength, etc. required in the finished product. In any event, within the product illustrated in FIG. 4, particular characteristics achieved by the composite material of variable density included general waterproof characteristics partly resulting from selection of the coal tar composition, electrical isolation of the rail 111 and high load bearing or mechanical strength particularly in the base 119 beneath the rail 111 and in the exposed regions represented by the areas 131 and 133.

It is further noted that similar results in the sense of waterproof characteristics and electrical isolation for example, could also be obtained through the use of appropriate fillers. However, the use of such fillers tends to make the method for forming the material more complex and may result in such undesirable characteristics such as short pot life, short working time after combination of the components within the mixing tube 143 and the like.

Furthermore, the use of such fillers in the form of aggregate or abrasive as described above in Example 11 would tend to be a source of moisture in the final product. Accordingly, the use of such fillers would also require complex handling procedures such as kiln drying for the aggregate prior to its combination with the material of the present invention. Otherwise, the use of such aggregates could facilitate migration of moisture through the material, thereby tending to eliminate the benefits of both waterproofing and electrical isolation as described above.

Examples 13 and 14 as described below illustrate another advantage of the present invention. In the preceeding examples and in the preceeding description with reference to FIG. 7, the invention contemplates selection of components such as those indicated at A and B in the preceeding description and in the various examples having a sufficient viscosity in order to produce cross linking within the expansion chamber 31 or 31' to assure containment of the blowing agent as the material exits the expansion chamber for transfer to the application site. However, some components selected for expanding various materials in accordance with the present invention have starting viscosities which are not sufficient for containing the blowing agent.

Examples 13 and 14 provide delay means to compensate for the low initial viscosity of the components. The delay means preferably allow additional cross-linking before the components are mixed with blowing agent in order to increase viscosity sufficiently for assuring containment of the blowing agent as contemplated by the present invention.

EXAMPLE 13

In this example, conventional A and B components were selected and are fully described in Table 9 as "FORMULATION MTS-8" in the June, 1981 publication by Mobay Chemical Company entitled *"Thick Section Coatings"* (C5-3B).

A main distinction in the A and B components of this example, compared with those described in the preceeding examples, is their very low viscosity and increased pot life greater than 24 hours. For example, normal viscosity of the A and B components may nominally be about 1200–1500 centipoise and 1200–1500 centipoise respectively. If such materials were combined in the mixing chamber 43 of FIG. 2 and immediately transferred to the expansion chamber 31 with the introduction of blowing agent, the low viscosities of the A and B components would not be sufficient to assure containment of the blowing agent as the material exited from the expansion chamber 31.

Figure 5:
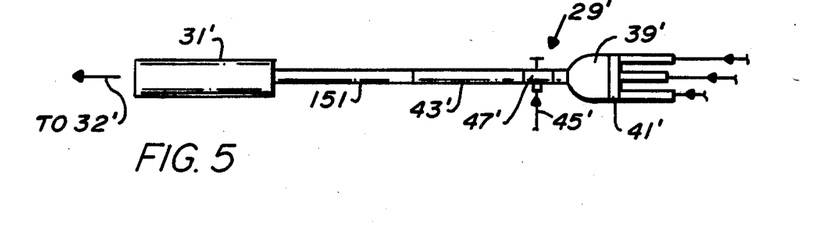

Accordingly, the steps of Example 13 were carried out in equipment generally similar to that illustrated in FIG. 2 but modified in accordance with the variation illustrated in FIG. 5. In addition, the A and B components of Example 13 were mixed at a 3:1 ratio. Referring to FIG. 5, components of the apparatus generally similar to those illustrated in FIG. 2 are indicated by corresponding primed numerals including the mixing manifold 39', the mixing tube 43', the conduit 45' for introducing blowing agent into the mixing chamber 43' and the expansion chamber 31'.

Internal dimensions of the expansion chamber 31' were similar to those described for preceding examples with higher viscosity materials. A delay tube 151 was inserted between the mixing tube 43' and the expansion chamber 31'. In this example, the length and internal diameter of the delay tube 151 were generally the same as the mixing tube 43'. However, the delay tube 151 of course did not include internal baffling as described above for the mixing tube 43 of FIG. 2.

Because of the arrangement of the delay tube 151 between the mixing tube 43' and the expansion chamber 31', the A and B components together with the blowing agent experienced additional dwell time within the delay tube 151. During that additional dwell time prior to passage into the expansion chamber 31', increased cross-linking between the A and B components occurred. Thus, as the A and B components passed into the expansion chamber 31' in intimately mixed relation with the blowing agent, they exhibited viscosity sufficient to assure substantially complete containment of the blowing agent.

EXAMPLE 14

In this example, conventional A and B components were employed and are fully described in Table 8 as "FORMULATION MTS-7" in the June, 1981 publication by Mobay Chemical Company entitled "Thick Section Coatings" (C5-3B).

The A and B components of this example were also characterized by very low viscosity and increased pot life of similar values as described for the A and B components in Example 13.

However, the A and B components of this example differed substantially in that they required intermixings at a ratio of 10:1. Accordingly, the steps of Example 14 were modified as described below to accommodate this ratio which might otherwise be somewhat difficult to maintain in conventional pumping or metering apparatus.

Figure 6:
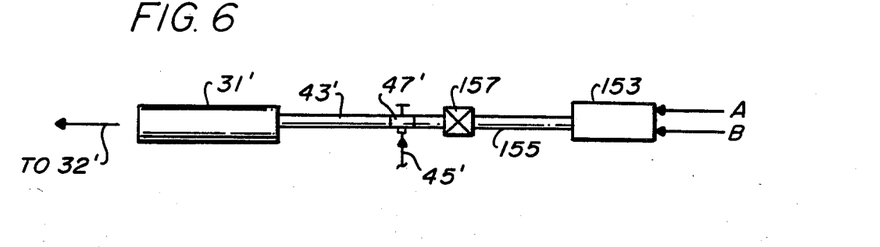

Example 14 was also carried out in apparatus generally similar to that illustrated in FIG. 2 but modified as illustrated by the fragmentary apparatus in FIG. 6.

Accordingly, components in FIG. 6 corresponding to components in FIG. 2 are identified by similar primed numerals. Thus, FIG. 6 also includes the expansion chamber 31', the conduit 45' for introducing blowing agent into the mixing chamber 43'. Rather than employing the mixing manifold 39 or 39' as illustrated in FIG. 5, the A and B components were initially premixed as indicated in block form at 153. The premixed A and B components from the mixer 153 were then passed through a delay tube 155 which similarly served to permit cross-linking of the A and B components as in the delay tube 151 described above with reference to FIG. 5.

Thereafter, the mixed A and B components from the delay tube 155 were regulated by a valve 157 for passage into the mixing tube 43'. Because of the increased viscosity for the combined components A and B caused by premixing at 153 and by dwell time within the delay tube 155, the combined A and B components within the mixing tube 43' developed sufficient viscosity so that they were capable of substantially completely containing the blowing agent as the material exited from the expansion chamber 31'.

Thus, although two variations of delay means are described in Examples 13 and 14 while being made apparent in the modified apparatus of FIGS. 5 and 6, additional delay means will be apparent within the scope of the present invention. Another effect of using a delay tube is to accommodate A and B component materials that are very high in viscosity at lower temperatures such as 70 degrees F. and very low at higher temperatures such as 130 degrees F. Even though they have not cross-linked through polymerization, they become sufficiently viscous to maintain cell formation upon cooling during inert gas injection and discharge.

While the preferred embodiments of the present invention have been illustrated and described above with a number of variations of the invention being represented by numerous examples, it is to be understood that these aspects of the invention are capable of further variation and modification, and it is therefore not wished that the invention be limited to the precise details set forth, but rather than the invention be contemplated with such additional changes and alterations as fall within the purview of the following claims:

I claim:

1. A method for forming a chemical composition from two liquid components selected for cross-linking reaction with each other, the chemical composition being adapted for variation of density of the resulting product by introduction of varying amounts of an inert blowing agent, said method comprising, selecting the liquid components to be suitable for interaction with each other to form a solid chemical composition product, storing each of the liquid components separately, individually transferring and separately regulating flow of the liquid components by separate regulating means to a mixing location, selecting an inert blowing agent in order to avoid altering chemical characteristics of the chemical composition product formed from the two liquid components, the blowing agent further being selected in order to produce density reduction within the chemical composition product by physical expansion, storing the blowing agent separately from the two liquid components, transferring the inert blowing agent to the mixing station, adjusting the regulated flow of inert blowing agent to the mixing station in order to mix a predetermined instantaneous amount of blowing agent with the two liquid components to achieve an instantaneously variable density for the resulting chemical composition product, conducting the mixture of the two liquid components and the blowing agent through an expansion chamber, selected with a configuration and internal dimensions for allowing substantially complete expansion of the chemical composition to a substantially relaxed condition by means of the blowing agent within the expansion chamber, and allowing the fully expanded chemical composition product to pass in its substantially relaxed and fully expanded condition from the expansion chamber to an application zone.

2. The method of claim 1 wherein the amount of inert blowing agent introduced to the mixing station is varied during formation of a composite structure between limits including substantially no blowing agent resulting in a chemical composition product of maximum density to a maximum amount of inert blowing agent resulting in a chemical composition product of minimum density, the configuration and size of the expansion chamber being selected to permit complete expansion of the chemical composition product before the product flows from the expansion chamber to the application zone.

3. The method of claim 2 wherein the expansion chamber has a tubular internal configuration with the mixing station being dispersed at one end thereof, the internal configuration of the tubular expansion chamber being selected for causing the fully expanded chemical composition product to pass from an opposite end of the expansion chamber to an application zone.

4. The method of claim 3 wherein the expansion chamber is in the range of about one to two feet in length with an effective inside cross-sectional dimension in the range of about one-half to two inches.

5. The method of claim 2 further comprising a structural member upon which the composite structure is formed.

6. The method of claim 5 wherein one of the two liquid components includes a coal tar product as a cross-linking agent.

7. The method of claim 2 wherein the composite structure includes foamed regions formed by introduction of selected quantities of blowing agent and solid regions exhibiting characteristics including structural strength and impact resistance.

8. The method of claim 1 wherein the liquid components are initially free of blowing agent whereby they can be stored in unpressurized containers and whereby the liquid components can be used in a variety of different applications including applications resulting in chemical composition products having varying densities.

9. The method of claim 1 wherein the chemical composition product is sprayed onto the application zone in the substantially fully expanded and relaxed condition.

10. The method of claim 9 wherein the spraying step is performed by entraining particles of the chemical composition product in its substantially fully expanded and relaxed condition in a moving gas stream.

11. The method of claim 10 wherein the moving gas stream is caused to pass through the expansion chamber for entraining the chemical composition product in its substantially fully expanded and relaxed condition at an outlet portion of the expansion chamber.

12. The method of claim 1 wherein at least one of the two liquid components exhibits characteristics resulting in insufficient viscosity for confining the blowing agent and further comprising the step of delaying passage of the components for causing them to experience dwell time selected for permitting cross-linking to increase viscosity of the mixture sufficiently for substantially fully confining the blowing agent as the chemical composition product exits the expansion chamber.

13. The method of claim 12 wherein the delay is introduced between the mixing station and the expansion chamber.

14. The method of claim 12 wherein the two liquid components are premixed and the delay is introduced between the premixing and the mixing station.

15. The method of claim 1 wherein the two liquid components are selected for forming a chemical composition product from the group consisting of polyether urethanes, polyester urethanes and epoxies.

16. The method of claim 15 wherein one of the liquid components is an isocyanate and the other liquid component is a polyol selected for cross-linking reaction with the isocyanate.

17. The method of claim 16 wherein one of the components includes a coal tar product as a cross-linking constituent.

18. The method of claim 1 wherein one of the components includes a coal tar product as a cross-linking constituent.

19. The method of claim 1 wherein the inert blowing agent is selected from the class consisting of fluorocarbons, nitrogen and inert pressurized gasses.

20. The method of claim 1 further comprising the step of arranging a mesh material in the application zone and applying the chemical composition product onto the mesh material.

21. The method of claim 20 further comprising the step of causing the chemical composition product to penetrate through the mesh material whereby the mesh material becomes an integral portion of the resulting product.

22. The product of the method of claim 21.
23. The product of the method of claim 20.
24. The product of the method of claim 11.
25. The product of the method of claim 7.
26. The product of the method of claim 6.
27. The product of the method of claim 5.
28. The product of the method of claim 2.
29. The product of the method of claim 1.

30. A method for forming a composite structural product which has substantially the same chemical composition throughout and which has regions of different densities, the composition structure being formed from two liquid components selected for cross-linking reaction with each other, the structure further being characterized by multiple internal regions of different densities at least some of the regions having foamed characteristics, said method comprising, selecting the two liquid components to be suitable for interaction with each other to form a solid chemical composition product, the two liquid components further being adapted for forming a chemical composition product suitable for density variation by introduction of varying amounts of an inert blowing agent, selecting an inert blowing agent suitable for combination with the two liquid components to form the chemical composition product, the blowing agent further being selected to avoid altering chemical characteristics of the chemical composition product formed from the two liquid components, the blowing agent also being selected in order to product density reduction within the chemical composition product by physical expansion rather than by chemical reaction, transferring the two components and the inert blowing agent to a mixing station for intimately mixing them, conducting the mixture from the mixing station through an expansion chamber having a configuration and size selected for allowing substantially complete expansion of the composite structural product within the expansion chamber, transferring the fully expanded composite structure product from the expansion chamber to an application zone, and varying or adjusting the amount of inert blowing agent transferred to the mixing station in order to mix an adjustable and predetermined amount of the blowing agent with the two liquid components in order to achieve a selected density for each internal region of the resulting composite structure product, the configuration and size of the expansion chamber being selected for allowing substantially complete expansion of each internal region of the composite structure product substantially entirely within the expansion chamber.

31. The method of claim 30 wherein the expansion chamber has a generally tubular internal configuration with the mixing station being located at one end thereof, an opposite end of the tubular expansion chamber forming an opening for permitting the fully expanded chemical composition product to pass from the expansion chamber to the application zone.

32. The method of claim 31 wherein said expansion chamber has a length in the range of about one to two feet and an inside cross-section dimension in the range of about one-half to two inches.

33. The method of claim 30 wherein the application zone includes a structural surface, the different internal regions within the chemical structure having densities selected for accomplishing different purposes with respect to the structural surface.

34. The product of the method of claim 33.
35. The product of the method of claim 32.
36. The product of the method of claim 31.
37. The product of the method of claim 30.

38. A method of forming a product to a selectable density which is not dependent upon containment or restraint and by means of a blowing agent which is chemically inert with the liquid mixture material, said method comprising, mixing a first component with a second component in a mixer to produce a liquid mixture material of a composition which has the characteristics to become a cross-linked product within a relatively short period of time after mixing, introducing into the liquid mixture material, while the liquid mixture material is still in liquid form, a selected amount of an inert blowing agent for causing the blowing agent to form cells in the liquid mixture material and to determine the density of the solid material which is ultimately formed, the inert blowing agent having no effect on the chemical composition of the product regardless of the amount of blowing agent employed on the resulting density of the product, conducting the liquid mixture material and injected gas or blowing agent to an expansion chamber having internal dimensions related to the characteristics of the liquid mixture material and the injected blowing agent in order to cause substantially all of the foaming action to occur in the expansion chamber, and then conveying the expanded material in a relaxed, substantially fully expanded state from the outlet of the expansion chamber to a zone of application.

39. The method defined in claim 38 wherein the volume and internal cross-sectional dimensions of the expansion chamber are matched to the heat of reaction and tendency of the blowing agent to expand during the time that the mixed components are in the expansion chamber to insure that all expansion occurs in the expansion chamber so that the density of products made by conveying the expanded material from the outlet of the expansion chamber to the zone of application is repeatable.

40. The method defined in claim 39 carried out continuously and wherein density of the material at the outlet of the expansion chamber is variable on a controllable, substantially instantaneous basis by varying the amount of blowing agent introduced into the liquid mixture material.

41. The method defined in claim 39 wherein the density of the material at the zone of application is variable from a highly expanded product having a minimum density to a solid product having a maximum density.

42. The method defined in claim 38 wherein the first and second components form the solid material by a cross-linking reaction.

43. The method defined in claim 42 wherein the cross-linking reaction is completed prior to the time the expanded material is conveyed from the outlet of the expansion chamber.

44. The method defined in claim 42 wherein there is sufficient cross-linking within the expansion chamber to confine the blowing agent to cause whatever expansion can take place to take place within the expansion chamber.

45. The method defined in claim 42 comprising an additional step of delaying passage of the first and second components toward the expansion chamber and after initial mixing of the components for developing efficient dwell time to permit cross-linking of the components and thereby increase their viscosity to a predetermined level.

46. The method defined in claim 42 wherein the expanded material exits the outlet of the expansion chamber in a granular form rather than in a froth form.

47. The method defined in claim 39 wherein the expanded material at the outlet of the expansion chamber is sprayed onto a surface to form a coating.

48. The method defined in claim 39 wherein the expanded material is poured by gravity into an open top container which determines the overall configuration of the expanded material after it has completely cured.

49. A system for forming a solid material to a selectable density which is not dependent upon containment in a mold and from a liquid mixture material which has the same chemical properties as the formed solid material and by means of a gas or blowing agent which is chemically inert with the liquid mixture material, said system comprising, mixing means for mixing a first component with a second component in a mixer to produce a liquid mixture material of a composition which has the characteristics to become a solid material within a relatively short period of time after mixing, means for introducing into the liquid mixture material, while the liquid mixture material is still in liquid form, a selected amount of a gas or blowing agent which is chemically inert with the liquid mixture material for causing the blowing agent to form cells in the liquid mixture material and to determine the density of the solid material which is ultimately formed, and expansion chamber means for conducting the liquid mixture material and injected blowing agent to an application zone, the expansion chamber having a volume and internal cross-sectional dimensions related to the characteristics of the liquid mixture material and the injected blowing agent for causing all of the foaming action to occur in the expansion chamber, whereby the expanded material is conveyed to the application zone from an outlet of the expansion chamber in a substantially relaxed, fully expanded condition.

50. The system of claim 49 further comprising means for introducing a moving gas stream through the expansion chamber for entraining particles of the expanded material in their substantially relaxed, fully expanded condition for spraying the expanded material onto the application zone.

51. The system of claim 50 wherein the means for introducing the moving gas stream is a Y-fitting on the expansion chamber, the outlet of the expansion chamber forming slot means for directing the entrained expanded material toward the application zone.

52. The system of claim 49 further comprising delay means for receiving the two components after initial mixing and prior to entry of the mixed components into the expansion chamber for causing the mixed components to experience dwell wherein cross-linking of the components increases their viscosity prior to entering the expansion chamber in order to insure substantial confinement of the blowing agent in the expanded material exiting the expansion chamber.

53. The system of claim 52 wherein the delay means comprises an extension arranged between the mixing means and the expansion chamber.

54. The system of claim 52 wherein the delay means comprises a means for premixing the components before they enter the mixing means.

55. The system of claim 49 wherein the first and second components are free from blowing agent before being mixed, the system further comprising unpressurized containers for the first and second components prior to their being introduced into the system.

56. A composite structure comprising a first, structural member and a second generally uniform chemical composition associated with the structural member, said chemical composition being formed from two liquid components selected for cross-linking reaction with each other, the chemical composition being adapted for variation of density of the resulting product by introduction of varying amounts of an inert blowing agent, the blowing agent being characterized by the ability to avoid altering chemical characteristics of the chemical composition product formed from the two liquid components, the blowing agent further being characterized by the ability to produce density reduction within the chemical composition product by physical expansion in response to heat rather than by chemical reaction, the chemical composition of the composite structure being formed with multiple internal regions all having substantially the same chemical composition, the multiple internal regions having respectively different densities for accomplishing different functions, the different densities being produced by different amounts of blowing agents combined with the two liquid components during formation of the different internal regions of the chemical composition.

57. The structure defined in claim 56 wherein the first structural member is a rail and the second generally uniform chemical composition provides insulation for the rail, the different internal regions comprising a base portion of substantially maximum density, intermediate regions adjacent lateral surfaces of the rail which are of reduced density while being capable of providing insulation for the rail and an upper region formed of relatively increased density.

58. The structure defined in claim 57 wherein the chemical composition comprises a skin of non-expanded material at its interface with the rail and at its exposed surfaces.

* * * * *

UNITED STATES PATENT AND TRADEMARK OFFICE
CERTIFICATE OF CORRECTION

PATENT NO. : 4,590,218

DATED : May 20, 1986

INVENTOR(S) : Richard T. Vass

It is certified that error appears in the above-identified patent and that said Letters Patent is hereby corrected as shown below:

Title page, Column 1, delete "Assignee: The O'Brien Corporation, South San Francisco, Calif."

Signed and Sealed this

Sixth Day of September, 1988

Attest:

DONALD J. QUIGG

*Attesting Officer*      *Commissioner of Patents and Trademarks*